United States Patent
Hulth (10) Patent No.: US 10,402,843 B2
(45) Date of Patent: Sep. 3, 2019

(54) ELECTRONIC SHELF LABEL POSITIONING METHOD AND SYSTEM

(71) Applicant: Pricer AB, Stockholm (SE)

(72) Inventor: Nils Hulth, Stockholm (SE)

(73) Assignee: Pricer AB, Stockholm (SE)

( * ) Notice: Subject to any disclaimer, the term of this patent is extended or adjusted under 35 U.S.C. 154(b) by 0 days.

(21) Appl. No.: 15/302,317

(22) PCT Filed: Apr. 11, 2014

(86) PCT No.: PCT/SE2014/050453
§ 371 (c)(1),
(2) Date: Oct. 6, 2016

(87) PCT Pub. No.: WO2015/156719
PCT Pub. Date: Oct. 15, 2015

(65) Prior Publication Data
US 2017/0024756 A1    Jan. 26, 2017

(51) Int. Cl.
*G06Q 30/00* (2012.01)
*G06Q 90/00* (2006.01)
(Continued)

(52) U.S. Cl.
CPC ......... *G06Q 30/0207* (2013.01); *G06Q 10/04* (2013.01); *G06Q 30/0261* (2013.01);
(Continued)

(58) Field of Classification Search
CPC .... G06Q 10/04; G06Q 30/0207; G06Q 90/00; G06Q 30/0631; G06Q 30/0633;
(Continued)

(56) References Cited

U.S. PATENT DOCUMENTS 9,818,148 B2 * 11/2017 Bynum ............. G01C 21/3484
2001/0051901 A1    12/2001 Hager et al.
(Continued)

FOREIGN PATENT DOCUMENTS

| | | |
|---|---|---|
| EP | 2797040 A1 | 10/2014 |
| GB | 2336925 A | 11/1999 |
| JP | 2007128397 | 5/2007 |
| WO | 2005060698 A2 | 7/2005 |
| WO | 2007145648 A1 | 12/2007 |
| WO | 2014138256 A1 | 9/2014 |

OTHER PUBLICATIONS

International Search Report to corresponding PCT application PCT/SE2014/050453, dated Feb. 27, 2015, 4 pages.
(Continued)

*Primary Examiner* — Dionne Pendleton
(74) *Attorney, Agent, or Firm* — Cooper Legal Group, LLC; Ronald M. Kachmarik (57) ABSTRACT

A method is applied in a positioning Electronic Shelf Label, ESL, system, wherein each ESL of a set of ESLs is being associated with a target position datum, and wherein each item positioned in a sales area is associated with an ESL. The method includes receiving checklist data indicating at least one sales area item; updating a current set of target position data; receiving a user terminal position datum; monitoring the user terminal position datum; and if a set of triggering criteria is met triggering an alert. Checklist data may be derived from a user terminal GUI, and be received in the user terminal, or be received in the ESL control unit from the user terminal or from another available system interface. Further, a system, a user terminal, an ESL, a computer program and a computer program product is provided. Embodiments enable improved increased efficiency for customers or in-store staff.

14 Claims, 5 Drawing Sheets

(51) Int. Cl.
| | |
|---|---|
| *G06Q 30/06* | (2012.01) |
| *G06Q 30/02* | (2012.01) |
| *G06Q 10/04* | (2012.01) |
| *H04W 4/04* | (2009.01) |
| *H04W 4/80* | (2018.01) |

(52) U.S. Cl.
CPC ..... *G06Q 30/0633* (2013.01); *G06Q 30/0639* (2013.01); *G06Q 30/0641* (2013.01); *G06Q 90/00* (2013.01); *H04W 4/04* (2013.01); *G09G 2380/04* (2013.01); *H04W 4/80* (2018.02)

(58) Field of Classification Search
CPC ............. G06Q 30/0639; G06Q 10/087; G06Q 30/0261; G06Q 90/20; H04W 4/008; H04W 4/04; H04W 4/80; H04W 48/16; H04W 4/021; H04W 4/12; H04W 84/12; G01C 21/3484; G01G 19/4144; G01G 19/42; G01S 13/767; G01S 5/02; G09G 2370/16; G09G 2380/04; Y04S 10/54
See application file for complete search history.

(56) References Cited

U.S. PATENT DOCUMENTS

| | | |
|---|---|---|
| 2010/0070365 A1 | 3/2010 | Siotia et al. |
| 2011/0178863 A1 | 7/2011 | Daigle |
| 2015/0039462 A1* | 2/2015 | Shastry .............. G06Q 30/0633 |
| | | 705/26.7 |

OTHER PUBLICATIONS

Liu et al., Location Technology-Based Mobile Shopping Service System, International Journal of Hybrid Information Technology, vol. 5, No. 4, Oct. 2012; Whole Document.

Dr. Rainer Mautz, Indoor Positioning Technologies, Institute of Geodesy and Photogrammetry, Department of Civil, Environmental and Geomatic Engineering, ETH Zurich Application for Venia Legendi in Positioning and Engineering Geodesy, Feb. 2012; pp. 57-64.

* cited by examiner

ELECTRONIC SHELF LABEL POSITIONING METHOD AND SYSTEM

FIELD OF THE INVENTION

The present invention generally relates to the field of Electronic Shelf Label systems.

BACKGROUND OF THE INVENTION

An electronic shelf label, conventionally abbreviated ESL, is used for electronically displaying information such as price, label and product name for products and services available for customers. A plurality of ESLs is typically integrated in an ESL system for enabling central control of the information displayed on each ESL. The ESLs are communicating with a central control unit of the ESL system thereby enabling e.g. reduction of staff resources for updating information displayed on the ESLs. This is especially true e.g. for modern hypermarkets offering as much as 100 000 items distributed over vast areas, e.g. 20 000 $m^2$. In an ESL system, each ESL wirelessly communicates with one or more transceivers, normally mounted in the ceiling of the store. The transceivers in turn communicate with base stations connected to and controlled by the central control unit. An example of such an ESL system is disclosed in WO 2014/7734, Pricer A B, in which the communication between ESLs and the transceivers are effected by means of diffuse infra red (DIR) technology.

Many customers today, especially those living in cities, are acutely time and promotion-sensitive—they don't want to lose unnecessary time shopping in stores and are continuously searching the best offers. For them, the best, most enjoyable shopping experience is one that is efficient, streamlined and helps them benefit from promotions. This may be difficult to achieve especially in a modern day hypermarket.

SUMMARY OF THE INVENTION

It would be advantageous to achieve apparatuses and methods overcoming, or at least alleviating, the above mentioned drawbacks.

To better address one or more of these concerns, a positioning ESL system, and apparatuses and methods of a such, having the features defined in the independent claim is provided. Preferable embodiments are defined in the dependent claims.

Hence, according to a first aspect, a method is provided. The method of the first aspect is applied in an Electronic Shelf Label, ESL, system, said ESL system comprising a set of Electronic Shelf Labels, ESLs, an ESL control unit configured to manage position data, and a user terminal, wherein each ESL of the set of ESLs is being associated with a target position datum, and wherein each item positioned in a sales area is associated with an ESL. The method of the first aspect comprises the steps    receiving checklist data indicating at least one sales area item;

updating a current set of target position data;

receiving a user terminal position datum;

monitoring the user terminal position datum; and if a set of triggering criteria is met triggering an alert.

The method enables improved shopping experience for a private customer or increased efficiency for in-store staff. The checklist data may be derived from a user interface of the user terminal and received in an ESL system functionality unit of the user terminal. The checklist data may alternatively be received in the ESL control unit from the user terminal or from another system interface available to the ESL control unit.

The checklist may concern a shopping list of a private customer, a picklist based on e.g. an on-line customer shopping list, assigned to a person of the staff of a retailer, or similar. It can further concern items or locations to be serviced in other ways, such as re-stocking, furnishing or servicing of promotional areas or other functions distributed over a sales area.

The user terminal position datum may be received from a separate positioning server. Alternatively, the ESL control unit may itself comprise the necessary positioning functionality, implemented by a processor unit and a memory unit comprised in the control unit.

According to an embodiment the step of monitoring the user terminal position datum comprises the further step:

deriving, from the user terminal position datum and a target position datum of the set of target position data, a distance between the user terminal position and the target position.

According to an embodiment of the first aspect, the further steps are comprised: receiving data indicating an item having been checked; and updating a current set of checked items based on the received data indicating an item having been checked.

This embodiment may provide the advantage that items may be checked even though they were not initially or previously on the checklist. This may further enable e.g. adding target locations associated with a group of related items if one of the items of the related items have been checked.

The set of triggering criteria may comprise a criterion that the user terminal position is within a predefined range from the said target position.

The set of triggering criteria comprises a criterion that the user terminal position is within a target area, said target area defined in relation to the said target position.

The step of triggering an alert may comprises triggering a signaling device associated with the said target position datum.

This enables e.g. visual or aural signaling of the location to a customer, thereby directing the customer to the sought-after item.

According to an embodiment, the method comprises the step un-triggering the said triggered signaling device, upon receiving data indicating an associated item having been checked.

A customer or personnel may indicate to the system that an item has been checked by e.g. the user terminal scanning a bar code on the ESL or on the item itself. The indication may be conveyed to the control unit from the ESL or from the user terminal.

According to an embodiment the method may comprise receiving promotional list data; and updating the current set of target position data based on the promotional list data.

This enables e.g. an operator of the ESL system, as opposed to a user (such as e.g. a customer) to promote items by adding them to the current list.

Updating the current set of target position data may be conditional on a received user terminal position datum.

This enables e.g. adding target locations based on the route taken. The promotional list data may indicate associations between certain sub-areas of the sales area, e.g. the snacks section is associated with the soda section, such that if the customer passes the snacks section, a target position associated with the soda section may be added to the set of current target position data.

According to an embodiment the method may comprise calculating a recommended route direction based on the current set of target position data.

The control unit may calculate the recommended route direction and provide it to the user terminal. It may then be conveyed to the user via e.g. a GUI of the user terminal According to an embodiment, the user terminal is provided with the current set of target position data, thereby enabling calculating a recommended route data in the user terminal.

A second aspect of the invention is a control unit in an Electronic Shelf Label system, ESL system, said system comprising a set of Electronic Shelf Labels, ESLs, each ESL of the set of ESLs being associated with a target position datum, said control unit configured to
  manage position data;
  receive checklist data indicating at least one sales area item;
  update a current set of target position data;
  receive a user terminal position datum;
  monitor the user terminal position datum; and
  if a set of triggering criteria is met
  trigger an alert.

A third aspect of the invention is a signaling device in an Electronic Shelf Label, ESL, system said system comprising a set of Electronic Shelf Labels, ESLs, each ESL of the set of ESLs being associated with a target position datum, said signaling device configured to issue an alert triggered if a user terminal position is within a predefined range from a certain target position associated with the signaling device.

According to an embodiment of the third aspect the signaling device may be configured to operate as an ESL associated with the said certain target position.

A fourth aspect of the invention is a user terminal configured to perform the method according to the first aspect.

A fifth aspect of the invention is a computer program including program instructions which when executed by a processor, cause the processor to perform the method of the first aspect of the invention.

In an embodiment of the fifth aspect the computer program is embodied on a record medium, stored in a computer memory, embodied in a read-only memory or carried on an electrical carrier signal.

A sixth aspect of the invention is a computer program product, comprising a computer readable medium, having thereon: computer program code means, when said program is loaded, to make the computer execute a process of the first aspect.

A computer program product may e.g. be embodied as a so called smartphone and a computer program may be embodied as a so called "app" downloadable to and installed in a smartphone.

It is noted that embodiments of the invention relates to all possible combinations of features recited in the claims. Further, it will be appreciated that the various embodiments described for the device are all combinable with the method as defined in accordance with the second aspect of the present invention.

BRIEF DESCRIPTION OF THE DRAWINGS

This and other aspects will now be described in more detail in the following illustrative and non-limiting detailed description of embodiments, with reference to the appended drawings.

All the figures are schematic, not necessarily to scale, and generally only show parts which are necessary in order to elucidate the embodiments, wherein other parts may be omitted. Like reference numerals refer to like elements throughout the description.

DETAILED DESCRIPTION OF EMBODIMENTS

Figure 1:
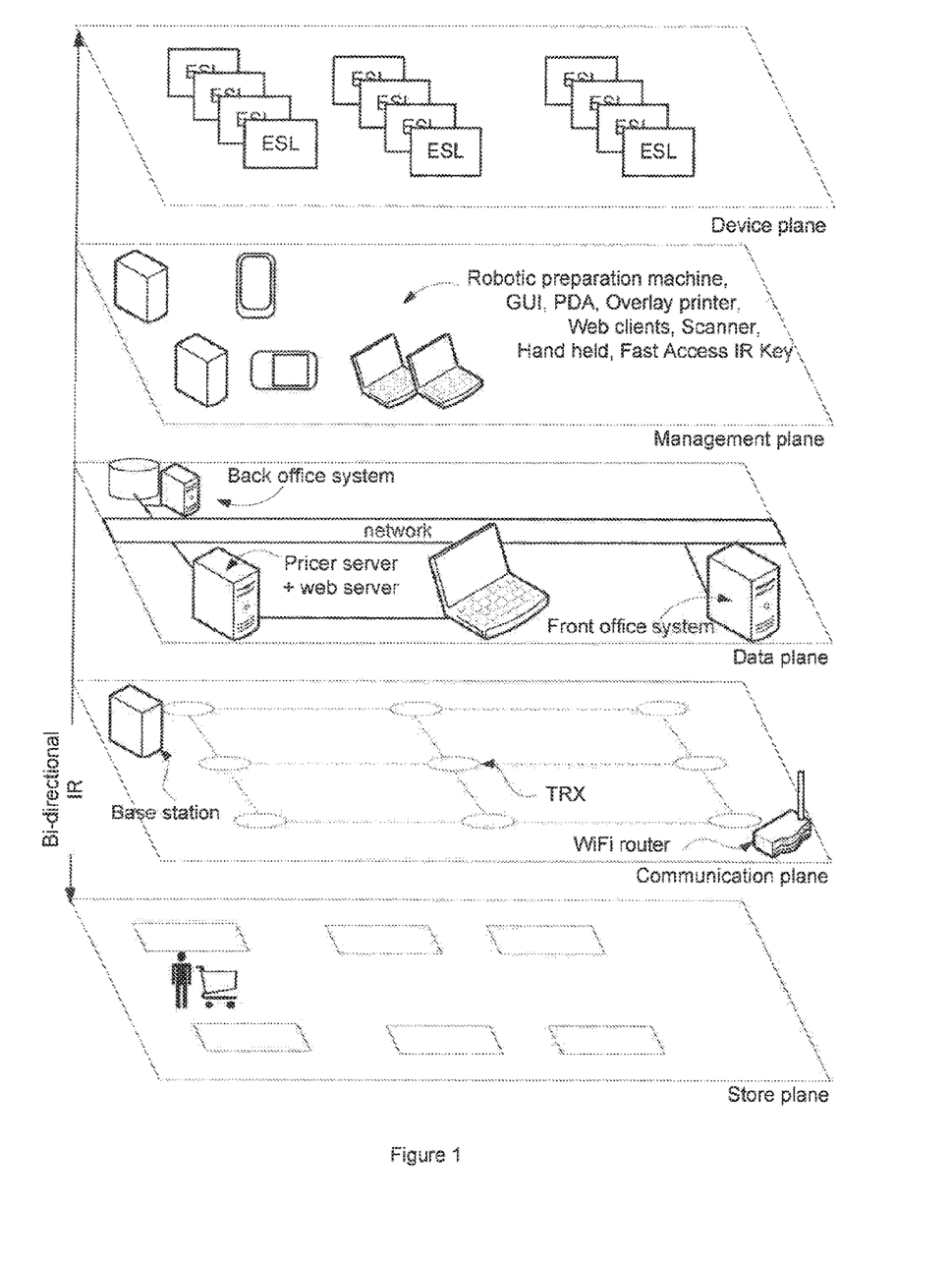
FIG. 1 shows an overview of an ESL system.
Figure 2:
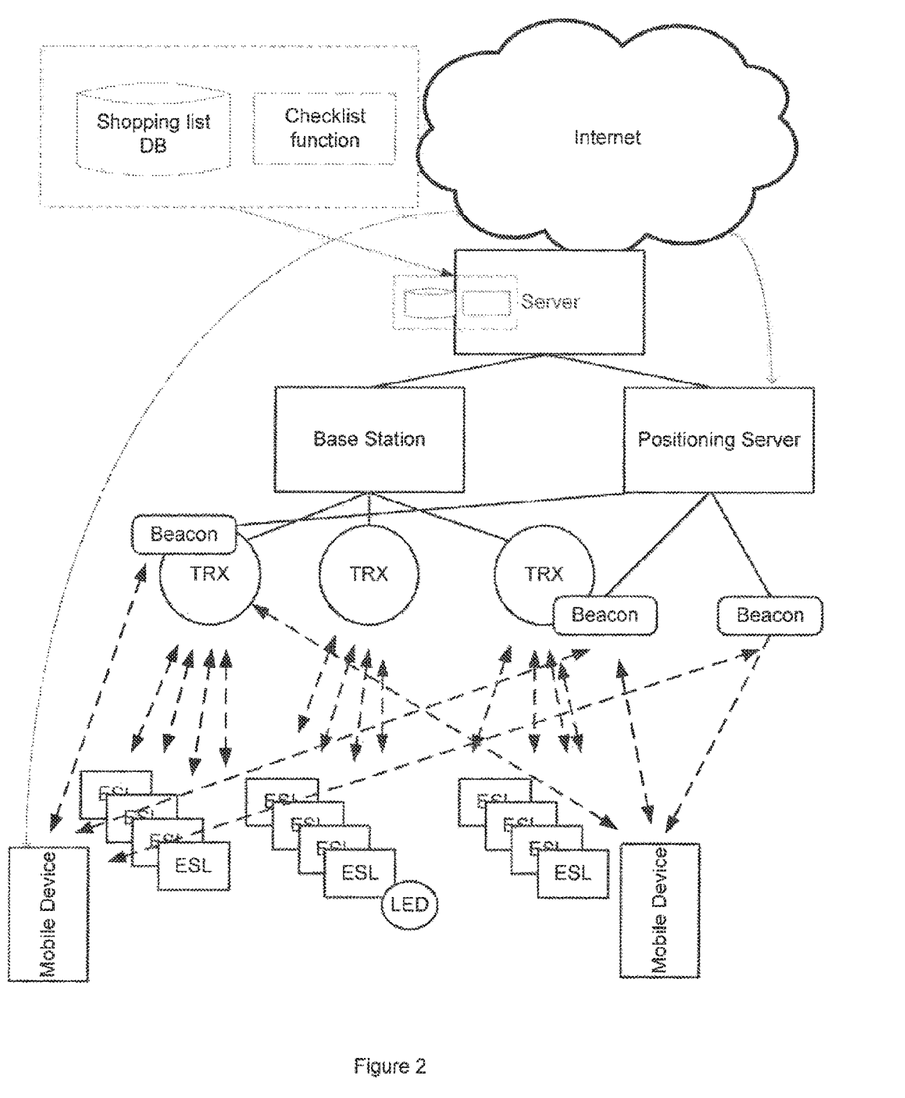
FIG. 2 shows an exemplary overview of a positioning ESL system according to an embodiment.

With reference to FIGS. 1 and 2, an electronic shelf label, ESL, system according to embodiments of the present invention will be described.

As illustrated in FIG. 1, an ESL system comprises a plurality of ESLs for use in a store. The ESLs may be used for displaying information, such as label, price and product information, to customers in the store. The ESLs in the system communicate with a central control unit of the ESL system, interchangeably referred to as ESL server, making it possible to update and change the information displayed on the ESLs.

Each ESL may communicate via diffuse IR radiation with transceivers mounted in the ceiling of the store. The transceivers communicate with base stations, e.g. via a twisted pair cable network, and the base stations in turn communicate with the central control unit (or server) e.g. via an Ethernet network, a serial link or wirelessly. The communication between the ESLs and the central control unit may preferably be a two-way communication for enabling updating information in the ESL and sending acknowledgement receipts from the ESL back to the central control unit. In other embodiments the ESL communication may be based on proprietary radio based protocols and/or standards such as e.g. DECT or Zigbee.

A positioning ESL system according to an embodiment will be described with reference to FIG. 2.

The ESL positioning system according to the embodiment comprises an Electronic Shelf Label, ESL, system and a positioning function. The positioning function may be implemented in a separate server or as a positioning function unit in an ESL server.

The ESL system comprises all the components that are necessary to implement a scalable ESL system.

As illustrated in FIG. 2, the ESL system comprises an ESL server, and at least one ESL base station, BS. Each BS comprises one or many transmit/receive units, TRXs. The ESL system further comprises multiple ESLs. A BS may typically cover a sales area footprint of some 100 m2, and is scalable such that one ESL server may service a multitude of BSs.

Each ESL is configured to transmit and receive information from the BS. The transmitted and received information may be carried by diffuse infrared, DIR, based communication or radio based communication according to standards such as e.g. WIFI, GSM or 3G.

The ESL positioning system further comprises a positioning function, adapted and configured to determine, transmit, receive, store and process positioning data. The positioning function may be implemented as an integrated functional unit comprised in the ESL server, or a distributed positioning sub-system. The positioning data may be two- or threedimensional coordinates. The coordinates may be e.g. a global map or local, i.e. coordinates of a local store map possibly in combination with e.g. a planogram, or a 3D map. The map may be managed by the positioning function.

In FIG. 2, the positioning function is illustrated as a unit separate from the ESL server. However, some or all parts of the positioning unit functionality may be implemented by a processing unit and a memory unit comprised in the ESL server.

The ESL positioning system further comprises a mobile user terminal. The mobile user terminal may be a mobile phone, a smartphone a PDA, a PC tablet, a dedicated ESL system scanner or the like.

The positioning function is configured to position the user terminal in relation to the map. The positioning may be performed using triangulating beacons, through time-of-flight, TOF, sensors or through other means such as e.g. Global Positioning System, GPS, positioning. The positioning function may be adapted and configured to communicate over the Internet.

The positioning function is further configured to receive, transmit, store, process and manage positioning data assigned to each ESL comprised in the ESL positioning system. The positioning data may be dynamically assigned to the ESL, or pre-configured.

A checklist function implemented according to embodiments will now be described in relation to FIG. 3. The arrows are intended to illustrate exemplary logic associations between various items of data and/or physical items (not necessarily excluding communication paths and/or physical connections).

A map (illustrated as the checkered square) of a sales area is associated with the positioning function. Sales area items associated with sales area item IDs, are distributed over the sales area. The sales area item IDs are registered in a shopping list database. A sales area item is located at or adjacent to a target position. At that same target position, an ESL of a multiple of ESLs distributed over the sales area (not shown) is located. A data object referred to as a target position datum is associated with the target position and may be managed by the positioning function. The target position datum may constitute an association between the sales area item ID and the ESL. Each sales area item ID may be associated with an ESL, directly or indirectly. FIG. 3 further illustrates a user terminal present in a sales area. The user terminal may be positioned by the positioning function. A data object referred to as a user terminal position datum is associated with the user position and may be managed by the positioning function. The user terminal may further be associated with a checklist data object. The checklist data object is managed by a checklist function and points to one or many sales area items registered in the shopping list database.

It should be noted that sales area items having the same sales area item ID may be positioned on more than one position, and hence that several ESLs may be associated with the same sales area ID. Further, more than one ESL could be associated with the same target position datum, depending on the granularity of the map coordinates. Each ESL, however, is associated with one target position datum only and usually only with one sales area item ID. Hence, the directions of the arrows illustrate examples of how the associations are not necessarily unique in both directions.

The positioning function is configured to monitor the user terminal position, and may provide or assist in providing directions to facilitate for the user of the user terminal to find his or her way through the sales area to the sought-after shopping item. The positioning function is further configured to detect if the user terminal comes within a predefined range from the target position, in which case an action may be triggered. The action can comprise issuing an alert, e.g. audible, visual alert, to bring the whereabouts of the shopping list item to the attention of the shopper. The action can comprise publishing certain information decodable by a human eye, or e.g. by a scanner, on a signaling device further associated with or comprised within the ESL. Besides actions triggered by the positioning function, additional communication functionality comprised in the positioning ESL system may enable triggering additional actions.

Figure 3:
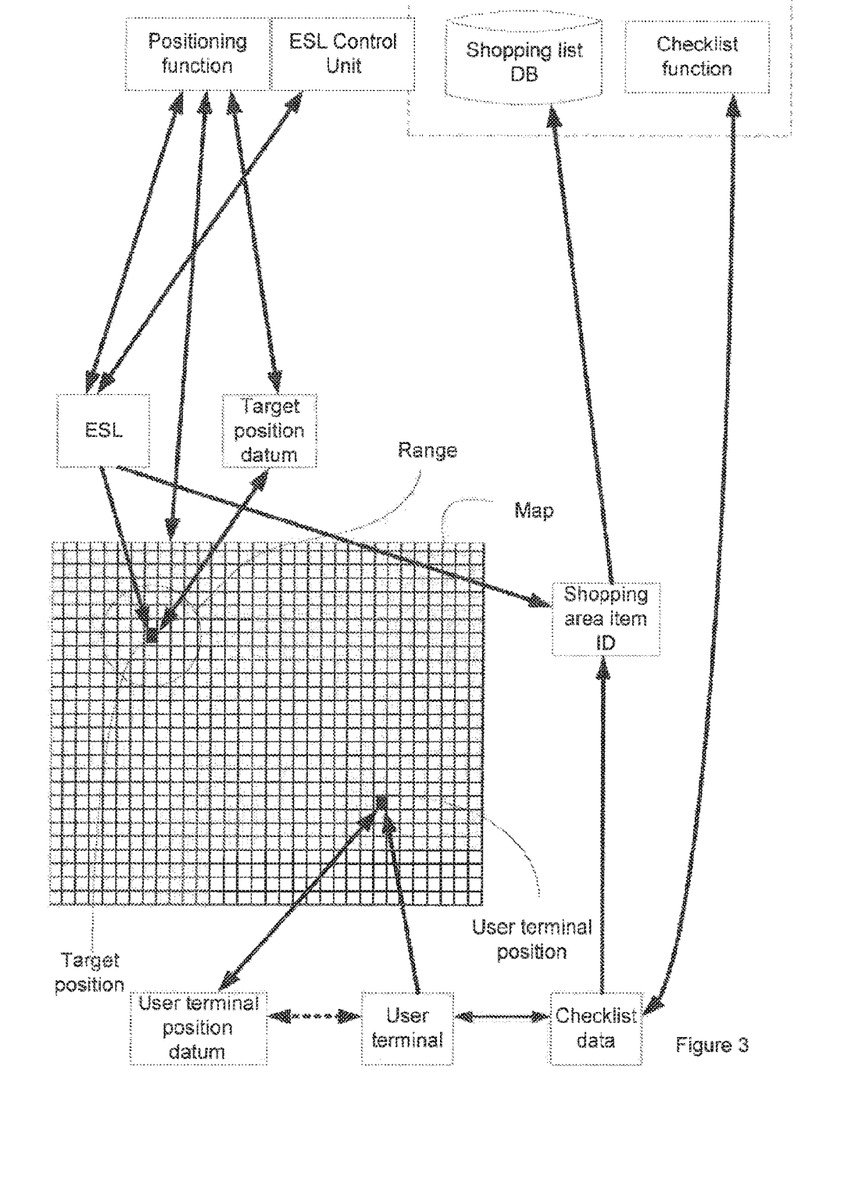
FIG. 3 shows an overview of logical associations within a positioning ESL system embodiment.

Not shown in FIG. 3 is how according to embodiments, two sales area item categories may be associated. In an exemplary Swedish hypermarket meatball products may be associated with lingonberry products, as meatballs and lingonberries is a common dinner combination in Swedish households. Further, two shopping sub-areas may be associated with each other, such that e.g. the snacks section may be associated with the soda section.

The positioning ESL system may be equipped with Near Field Communication, NFC, or RFID-enabled ESLs. Not only do these bring with them all the benefits of ESLs—centralized price automation—but the NFC capability mean that customers can access more information about a sales area item—ingredients, pictures, and other relevant data, e.g. by putting an NFC-enabled user terminal, e.g. a smartphone next to the ESL.

The checklist functionality may allow users to create a digital shopping list, and also allows them to research products by searching the shopping item database—meaning they can prepare their cart before they even arrive at the store. The checklist functionality may further generate recipe ideas, and, when a recipe is selected by the user, highlight and suggest other sales area items. Once a customer is inside the store, which is equipped with a positioning functionality, the customer's route can be optimised based on his or her shopping list. This function alone has been observed to create time saving of up to 5 minutes for ten products.

The positioning ESL system may be configured such that a sales area item ID comprised in the checklist data may be removed therefrom conditional upon a predefined event, such as e.g. the customer scanning a code on the ESL. In this manner, the checklist data may be updated.

Additionally or alternatively, when the customer scans a code on the ESL or in another way indicates that s/he has picked an shopping item, the associated shopping item ID may be added to a shopping cart list.

In embodiments, sales area item IDs may be added to the checklist prior to, initially or during the shopping session, either by the user/customer or, e.g. for promotion purposes, by an operator of the positioning ESL system. The positioning ESL system may be configured to update the checklist to include promotional data. The checklist may be updated with promotional data conditionally. Such conditions may include adding e.g. a first shopping item ID to the checklist if the customers shopping cart list indicates that the customer has picked a second shopping item ID associated with the first shopping item ID.

Promotions and special deals may be showcased and enabled via the checklist functionality, ensuring customers are able not only to save precious time, but are also able to save money.

The ESL labels may be linked to the shopping item database and thus the checklist functionality may ensure that there are no price discrepancies and that in-store position is even more accurate—the product price conveyed to the customer by the checklist functionality is the same price that they pay at the counter, and the item is where the checklist functionality says it will be.

To an operator of an ESL system, embodiments enable a better understanding of customers' behaviour both in-store and digitally. To a user of the ESL system, the improved customer experience adds fluidity to the shopping experience.

Figure 4:
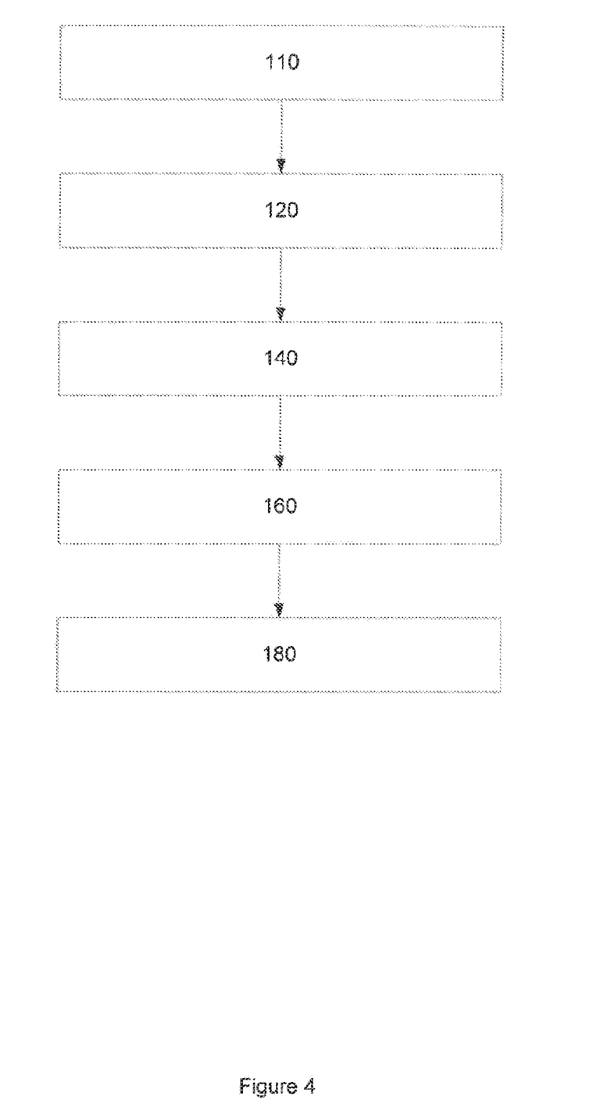
FIG. 4 shows a method according to an embodiment.

A method 100 according to an embodiment will now be described in relation to FIG. 4. The exemplary method is performed in the control unit of a positioning ESL system. Prior to entering the sales area a user has accessed a user interface of the checklist function, e.g. via a smartphone. The user interface may be an Internet user interface. The user indicates to the user interface a set of sales area items that the user intends to purchase, and as a consequence the control unit receives 110 checklist data. The control unit updates 120 a current set of target position data based on the received checklist data. As the user enters the sales area, the positioning function acquires the position of the user terminal position, for example in relation to a map over the sales area, and makes it available for the control unit to receive 140.

As the customer moves within the sales area, the control unit monitors 160 the position and movements of the user, through detecting the user terminals current position. Previously detected user positions may be stored and processed to enabling monitoring e.g. for user movement patterns.

Figure 5:
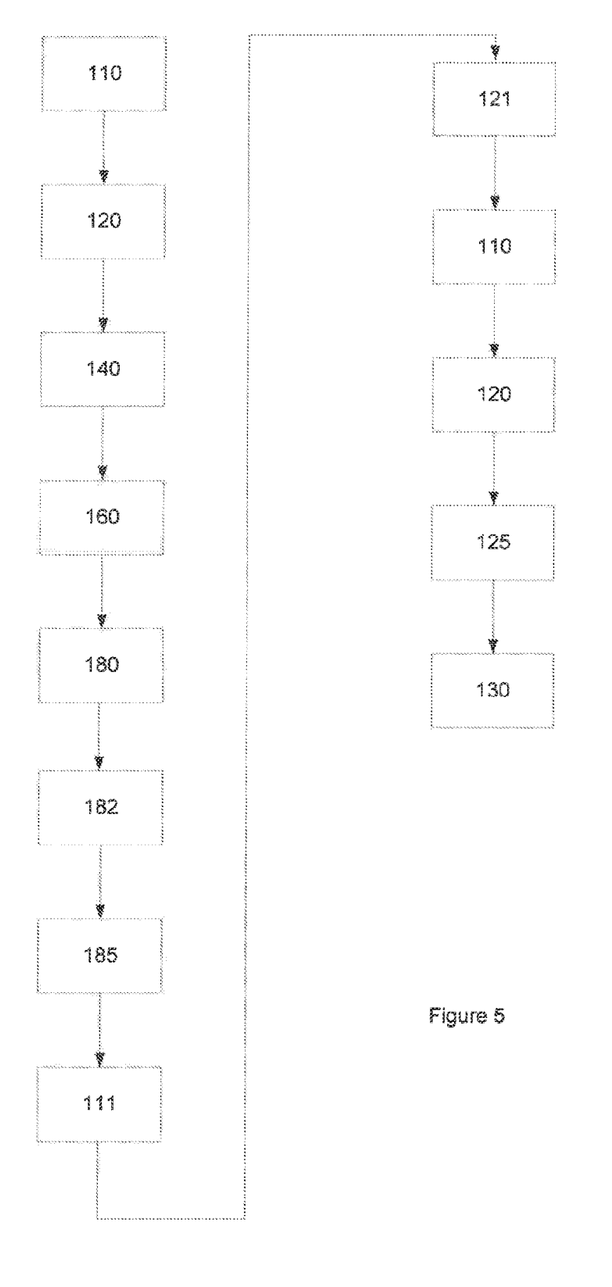
FIG. 5 shows an example sequence according to an embodiment.

As the user comes within a predefined range of an ESL associated to a shopping item on the customers checklist, the control unit may rigger 180 an alert. In an exemplary embodiment, a signaling device comprised in the ESL is triggered 182 to issue the alert, as illustrated in FIG. 5. The alert assists the customer in finding the sought-after shopping item.

The customer picks the shopping item from the shelf and also checks the associated item on his checklist, via a checklist function interface on his smartphone, to indicate that he has found the item. The control unit receives an indication that the item has been checked, and as a consequence updates the checklist data. Further, the control unit un-triggers 185 the signalling device, e.g. by sending an un-trigger signal to the signalling device.

In this exemplary embodiment, the control unit receives 111 a list of items to be promoted, and updates 121 the users current set of target position data based on the received promotional list.

In this exemplary embodiment, the user may indicate to the user interface a set of additional sales area items that the user intends to purchase, and as a consequence the control unit receives 110 checklist data multiple times. The control unit updates 120 a current set of target position data multiple times, based on the received checklist data.

Based on the current set of target position data, a recommended route may be computed, and conveyed to the customer, 125, 130. The computation of an optimal route may not necessarily be performed in the control unit, but may be distributed to another node in the positioning ESL system.

Each of the positioning function, the shopping list database and the checklist function may be an integral part of the control unit, implemented by a processor and a memory comprised in the control unit.

Alternatively, each of the positioning function, the shopping list database and the checklist function or a part of each said function may be implemented as distributed in the positioning ESL system.

According to embodiments, a part of, or all of, the checklist function may be implemented in a user terminal such as e.g. a smartphone.

According to embodiments method 200 steps corresponding to method 100 steps described as comprised in the method performed in the control unit may be performed in a user terminal, such as e.g. a smartphone.

The person skilled in the art realizes that the present invention by no means is limited to the embodiments described above. On the contrary, many modifications and variations are possible within the scope of the appended claims.

For instance, the user may be a member of staff assigned to collect a set of items-to-order for a customer.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method in an Electronic Shelf Label (ESL) system, said ESL system comprising a set of Electronic Shelf Labels (ESLs), and an ESL control unit configured to manage position data, wherein each ESL of the set of ESLs is associated with a target position datum, and wherein each sales area item of a set of sales area items positioned in a sales area is associated with an ESL of the set of ESLs, said method comprising the steps:

receiving checklist data indicating at least one sales area item of the set of sales area items;

updating a current set of target position data to include at least one target position datum associated with at least one ESL associated with said at least one sales area item indicated by the received checklist data;

deriving a user terminal position datum for a user terminal;

on condition that the user terminal position datum indicates that the user terminal is within a predefined range from a target position indicated by one of said at least one target position datum of the current set of target position data, triggering an alert at an ESL associated with said one of said at least one target position datum of the current set of target position data and with one of said at least one sales area item indicated by the checklist data;

determining that a sales area item has been checked by receipt of data indicating active user interaction with the checklist or data indicating that the ESL has been scanned or the sales area item has been scanned; and un-triggering the triggered alert, upon receiving data indicating an associated sales area item having been checked.

2. The method as defined in claim 1, comprising the further steps:

receiving data indicating an item having been checked; and updating a current set of checked items based on the received data indicating an item having been checked.

3. The method as defined in claim 1, wherein the step of triggering an alert comprises triggering a signaling device associated with the said target position datum.

4. The method as defined in claim 1, further comprising:
un-triggering the said triggered signaling device, upon receiving data indicating an associated item having been checked.

5. The method as defined in claim 1, further comprising:
receiving promotional list data; and
updating the current set of target position data based on the promotional list data.

6. The method as defined in claim 5, wherein the updating the current set of target position data is conditional on a received user terminal position datum.

7. The method as defined in claim 1, further comprising calculating a recommended route direction based on the current set of target position data.

8. The method as defined in claim 7, further comprising providing the user terminal with the recommended route direction.

9. The method as defined in claim 1, comprising the further step:
providing the user terminal with the current set of target position data, thereby enabling calculating a recommended route data in the user terminal.

10. An Electronic Shelf Label system (ESL) system comprising a set of Electronic Shelf Labels (ESLs), and an ESL control unit configured to manage position data, wherein each ESL of the set of ESLs is associated with a target position datum, and wherein each sales area item of a set of sales area items positioned in a sales area is associated with an ESL of the set of ESLs, said ESL system being configured to:
receive checklist data indicating at least one sales area item;
update a current set of target position data to include at least one target position datum associated with at least one ESL associated with said at least one sales are item indicated by the received checklist data;
derive a user terminal position datum for a user terminal;
on a condition that the user terminal position datum indicates that the user terminal is within a predefined range from a target position indicated by one of said at least one target position datum of the current set of target position data, trigger an alert at an ESL associated with said one of said at least one target position datum of the current set of target position data and with one of said at least one sales are item indicated by the checklist data;
determining that a sales area item has been checked by receipt of data indicating active user interaction with the checklist or data indicating that the ESL has been scanned or the sales area item has been scanned; and
un-triggering the triggered alert, upon receiving data indicating an associated sales area item having been checked.

11. The ESL system as defined in claim 10, wherein the ESL system is further configured to:
receive data indicating an item having been checked; and
update a current set of checked items based on the received data indicating an item having been checked.

12. The ESL system as defined in claim 10, wherein the ESL system is further configured to trigger an alert comprises triggering a signaling device associated with the said target position datum.

13. The ESL system as defined in claim 10, wherein the ESL system is further configured to un-trigger the said triggered signaling device, upon receiving data indicating the sales area item has been checked.

14. The ESL system as defined in claim 10, wherein the ESL system is further configured to:
receive promotional list data; and
update the current set of target position data based on the promotional list data.

* * * * *